United States Patent [19]

Hubbard et al.

[11] Patent Number: 6,086,991
[45] Date of Patent: Jul. 11, 2000

[54] METHOD OF PRIMING POLY(ETHYLENE TEREPHTHALATE) ARTICLES FOR COATING

[75] Inventors: Michael A. Hubbard, Somerset; James A. McCaulley, Clinton; Douglas R. Holcomb, South Orange, all of N.J.

[73] Assignee: Hoechst Trespaphan GmbH, Germany

[21] Appl. No.: 08/869,430

[22] Filed: Jun. 6, 1997

Related U.S. Application Data

[63] Continuation of application No. 08/662,837, Jun. 12, 1996, abandoned.

[51] Int. Cl.[7] .......................... B32B 18/00; B32B 27/08; B32B 27/30; B32B 27/36
[52] U.S. Cl. .......................... 428/336; 428/430; 428/441; 428/446; 428/451; 428/480; 428/483; 427/532; 427/533; 427/534; 427/536; 427/299; 427/314; 427/316; 427/384; 427/385.5; 427/393.5; 427/397.7; 427/397.8; 427/407.1; 427/419.1; 427/419.2
[58] Field of Search .................... 428/480, 430, 428/441, 446, 451, 483, 336; 427/532, 533, 534, 536, 299, 314, 316, 384, 385.5, 393.5, 397.7, 397.8, 407.1, 419.1, 419.2, 535, 322, 372.2

[56] References Cited

U.S. PATENT DOCUMENTS

| | | | |
|---|---|---|---|
| 1,949,914 | 1/1934 | Larson | 87/17 |
| 2,998,328 | 8/1961 | Munger et al. | 117/70 |
| 3,102,038 | 8/1963 | Fisher, Jr. | 106/84 |
| 3,130,061 | 4/1964 | McMahon et al. | 106/84 |
| 3,180,747 | 4/1965 | Patton et al. | 106/74 |
| 3,282,729 | 11/1966 | Richardson et al. | 117/138.8 |
| 3,470,013 | 9/1969 | Wagner | 117/70 |
| 3,476,582 | 11/1969 | Imoto | 117/62.2 |
| 3,481,764 | 12/1969 | Matsumoto | 117/62.2 |
| 3,492,137 | 1/1970 | Iler | 106/74 |
| 3,522,066 | 7/1970 | Forsyth | 106/74 |
| 3,533,816 | 10/1970 | Oken | 106/74 |
| 3,706,603 | 12/1972 | Vessey et al. | 148/6.2 |
| 3,884,863 | 5/1975 | Beers | 260/29.6 |
| 3,916,063 | 10/1975 | Dratz | 428/341 |
| 4,036,721 | 7/1977 | Kato | 204/181 |
| 4,101,050 | 7/1978 | Buckler et al. | 229/3.5 |
| 4,178,273 | 12/1979 | Brown | 260/29.4 |
| 4,247,576 | 1/1981 | Kutner | 427/40 |
| 4,254,170 | 3/1981 | Roullet et al. | 428/36 |
| 4,363,840 | 12/1982 | Roullet | 428/35 |
| 4,466,831 | 8/1984 | Murphey | 106/74 |
| 4,466,832 | 8/1984 | Yoshimura | 106/74 |
| 4,503,158 | 3/1985 | Richard | 501/27 |
| 4,514,456 | 4/1985 | Deal | 428/204 |
| 4,537,866 | 8/1985 | Gilson | 502/70 |
| 4,680,208 | 7/1987 | Aoki et al. | 428/35 |
| 4,681,818 | 7/1987 | Unnam | 428/607 |
| 4,738,896 | 4/1988 | Stevens | 428/315.9 |
| 4,775,586 | 10/1988 | Bohrn | 428/324 |
| 4,880,487 | 11/1989 | Sheehan et al. | 156/327 |
| 4,889,765 | 12/1989 | Wallace | 428/290 |
| 4,911,960 | 3/1990 | Mudge | 428/34.3 |
| 4,937,115 | 6/1990 | Leatherman | 428/36.4 |
| 4,945,074 | 7/1990 | Blount | 501/53 |
| 5,034,252 | 7/1991 | Nilsson et al. | 428/35.8 |
| 5,049,609 | 9/1991 | Patitsas | 524/386 |
| 5,055,137 | 10/1991 | Homcombe | 106/600 |
| 5,073,419 | 12/1991 | Kansupada et al. | 428/35.4 |
| 5,130,110 | 7/1992 | Rouet | 423/329 |
| 5,164,003 | 11/1992 | Bosco et al. | 106/287.1 |
| 5,183,704 | 2/1993 | Bohrn et al. | 428/305.5 |
| 5,192,620 | 3/1993 | Chu | 428/461 |
| 5,238,668 | 8/1993 | Novotny | 423/333 |
| 5,244,729 | 9/1993 | Harrison et al. | 428/331 |
| 5,290,845 | 3/1994 | Berg | 524/443 |
| 5,330,794 | 7/1994 | Bosco et al. | 427/387 |
| 5,344,633 | 9/1994 | Sorensson | 423/333 |
| 5,354,548 | 10/1994 | Araya | 423/700 |
| 5,384,192 | 1/1995 | Long et al. | 428/336 |
| 5,393,560 | 2/1995 | Okada | 427/150 |
| 5,451,455 | 9/1995 | Peiffer et al. | 428/323 |
| 5,462,779 | 10/1995 | Misiano | 428/34.7 |

(List continued on next page.)

FOREIGN PATENT DOCUMENTS

| | | |
|---|---|---|
| 16839 70D | 1/1972 | Australia . |
| 993738 | 7/1976 | Canada . |
| 084 266 | 6/1983 | European Pat. Off. . |
| 108 827 | 5/1984 | European Pat. Off. . |
| 311 432 | 4/1989 | European Pat. Off. . |
| 518646 | 12/1992 | European Pat. Off. . |
| 518647 | 12/1992 | European Pat. Off. . |
| S52-135339 | 11/1977 | Japan . |
| S60-5057 | 1/1985 | Japan . |
| H6-240174 | 8/1994 | Japan . |
| H7-18202 | 1/1995 | Japan . |
| 8092400 | 4/1996 | Japan . |
| 1007482 | 10/1965 | United Kingdom . |
| 1424425 | 2/1976 | United Kingdom . |
| 1 532 847 | 11/1978 | United Kingdom . |
| WO96/16798 | 6/1996 | WIPO . |

OTHER PUBLICATIONS

H. van Olphen, "Clay Minerology", *An Intro to Clay Colloid Chemistry*, 27:69–71 (1963).

H.H. Weldes & K.R. Lange, "Properties of Soluble Silicates", *Industrial & Engineering Chemistry*, 61 (4):29–44 (Apr. 1969).

W.J. Ward et al. "Gas Barrier Improvement Using Vermiculite & Mica in Polymer Film", *J. Membrane Science* 55:173–180 1991.

DuPont: "Fireproof Silicate Paints" Product Licensing Index., vol. 78 No. 8458, Havant GB, p. 177 XP002042865, no date.

*Primary Examiner*—Vivian Chen
*Attorney, Agent, or Firm*—Howson and Howson

[57] ABSTRACT

A barrier-coated polyester film comprises a polyethylene terphthalate substrate, a primer composition containing a vinyl polymer wherein at least 75% of the polymer repeat units contain side groups having hydroxyl moieties, and a waterborne, inorganic barrier coating. The primer coating facilitates the application and binding of the subsequently applied waterborne barrier coating composition to the substrate.

33 Claims, No Drawings

U.S. PATENT DOCUMENTS

| | | | |
|---|---|---|---|
| 5,487,940 | 1/1996 | Bianchini et al. | 428/349 |
| 5,491,023 | 2/1996 | Tsai et al. | 428/349 |
| 5,496,649 | 3/1996 | Mallory | 428/518 |
| 5,503,820 | 4/1996 | Moffett | 423/333 |
| 5,552,469 | 9/1996 | Beall | 524/445 |
| 5,560,773 | 10/1996 | Gimvang | 106/634 |
| 5,565,273 | 10/1996 | Egli | 428/426 |
| 5,575,953 | 11/1996 | Tachizono | 252/504 |
| 5,853,830 | 12/1998 | McCaulley | 428/35.7 |
| 5,882,798 | 3/1999 | Hubbard | 428/446 |
| 5,925,428 | 7/1999 | Hubbard | 428/34.5- |

METHOD OF PRIMING POLY(ETHYLENE TEREPHTHALATE) ARTICLES FOR COATING

This application is a continuation of application Ser. No. 08/662,837, filed Jun. 12, 1996, abandoned.

BACKGROUND OF THE INVENTION

The coating of thermoplastic polymer substrates with moisture resistant barrier coating compositions to provide impermeability to gases such as oxygen, and liquids, is known. See, e.g., U.S. Pat. No. 3,282,729, which describes applying a water solution of polyvinyl alcohol (PVOH) and trimethylolphenol to a thermoplastic polymer substrate at an elevated temperature. Also, for example, U.S. Pat. No. 5,073,419 refers to a film composite comprising a linear low density polyethylene film having a PVOH coat of a thickness of about 0.1 to about 3 mils. U.S. Pat. No. 5,487,940 refers to a metallized polymeric film structure including an oxygen barrier and a moisture barrier. The oxygen barrier includes cross-linked PVOH and the moisture barrier is preferably metallized oriented polypropylene or polyethylene.

Similarly, U.S. Pat. No. 4,254,170 refers to bioriented polyester hollow bodies wherein one wall of a preform is coated with an aqueous composition consisting of at least two incompatible polymers, one of which is a water soluble PVOH and the other, a polymer latex with low water sensitivity.

U.S. Pat. No. 5,384,192 refers to a structure comprising an inorganic oxide substrate having an organic polymer layer. There is an adhesion promoting layer between the substrate and organic polymer layer. One component of the adhesion layer is poly(vinyl phenol), also known as poly(para-hydroxystyrene).

U.S. Pat. No. 5,192,620 refers to a metallized film composition comprising a polymer substrate having a surface which is modified by an adhesion promoting agent, the modified surface is provided with a skin layer of PVOH. The PVOH skin layer is applied by a solution coating process. The skin layer has a metal layer directly thereon.

U.S. Pat. No. 5,491,023 refers to a metallized film composition comprising a polymer substrate having a surface which is modified by an adhesion promoting agent, the modified surface is provided with a skin layer of PVOH. The PVOH skin layer is applied by an extrusion process. The skin layer has a metal layer directly thereon.

European Patent Application No. 0 518 646 A1 refers to polymeric article comprising a polymer film, an acidic primer layer, and a barrier coating containing a layered mineral dispersed in an acidic polymeric matrix. The polymer material of the primer layer may be intrinsically acidic or may, for example with PVOH, contain an added mineral acid, preferably sulfuric acid at a concentration of 4% to 8% by weight relative to the primer polymer.

U.S. Pat. No. 5,330,794 refers to a ceramic protective coating on a surface, wherein said coating comprises a binder (e.g., potassium polysilicate), filler (e.g. talc, dichromium trioxide, ceramic fibers or microspheres), and in some cases active ingredients.

While conventional corona treatment of polyester polymeric articles immediately prior to application of a waterborne barrier coating is sufficient to achieve a good barrier coating, it is difficult to corona treat three-dimensional objects, such as bottles, uniformly. Thus presently available methods for applying waterborne coatings to polyester articles produce coatings that are uneven and possess less than optimal properties.

There remains a need in the art for better methods and compositions for applying waterborne coatings to polyester articles.

SUMMARY OF THE INVENTION

In one aspect, the present invention provides a barrier-coated poly(ethylene terephthalate) article comprising a poly(ethylene terephthalate) substrate; a primer layer containing a random vinyl polymer comprised of repeat units, wherein at least 75 percent of the polymer repeat units contain side groups having hydroxyl moieties; and an inorganic barrier layer applied from a waterborne coating solution.

In another aspect, the present invention provides a method for providing a barrier coating to a polyethylene terephthalate (PET) substrate. The method involves applying to the polymeric substrate a primer composition containing a random vinyl polymer comprised of repeat units, wherein at least 75% of the polymer repeat units contain side groups having hydroxyl moieties. The primer layer is then dried. The third step of the method involves subsequently applying a selected waterborne coating solution which forms a dry, inorganic barrier layer over the dried primer layer.

Other aspects and advantages of the present invention are described further in the following detailed description of the preferred embodiments thereof.

DETAILED DESCRIPTION OF THE INVENTION

The present invention provides a method of uniformly coating a polyester substrate, particularly a PET substrate, with a waterborne, inorganic barrier coating composition. This method permits a substantially continuous barrier coating to be applied to a three-dimensional PET article, and thus results in enhanced vapor barrier properties. The method can replace the use of corona treatment of PET articles and provide satisfactory barrier performance. The present invention involves applying a selected primer composition to the substrate prior to application of the barrier coating solution.

I. Definitions

The term "vapor" implies a liquid at partial pressure, such as water vapor. The term "gas" includes oxygen, nitrogen, carbon dioxide and others. "Aroma" includes those materials which bear a fragrance, for example, menthol and others. For simplicity, as used herein, the term "vapor barrier" can be interpreted to mean a barrier to gases and aromas as well as traditionally defined vapors.

Similarly as used herein, the term "solution" is interpreted to include colloidal dispersions and suspensions. By "colloidal dispersion or suspension" is meant any dispersion or suspension of particles in liquid, the particles being of a size greater than molecular scale that do not settle out. Generally the particle size in a suspension or dispersion of this invention are from about 10 to about 50,000 Angstroms. "Coating solution" as used herein is meant a liquid containing dissolved or suspended solids that do not settle out and which is used to apply said solids to a substrate.

By "waterborne" is meant coatings that are applied from solutions in which the solvent is primarily water, but which may contain smaller amounts of cosolvents such as, but not limited to, isopropanol.

II. The Primer Compositions

A primer composition according to the present invention contains a random vinyl polymer comprised of repeat units (i.e., derived from "vinyl" monomers like ethylene, propylene, vinyl acetate, vinyl phenol, etc.) wherein at least 75% of said polymer repeat units contain side groups having hydroxyl moieties. Desirably, vinyl polymers include poly(vinyl alcohol) and poly(para-hydroxystyrene).

In one embodiment, the vinyl polymer useful in the primer is a poly(vinyl alcohol) (PVOH). There are a number of PVOH variants available commercially and/or known in the art. For example, such PVOH variants vary in characteristics such as molecular weight, and percentage hydrolyzed. Poly(vinyl alcohol) is derived from poly(vinyl acetate) by hydrolysis of the acetate function. Typically a fraction of the acetate functions are left intact to impart different properties. The percent hydrolysis refers to the fraction of acetate groups which have been hydrolyzed to hydroxyl moieties. Desirably, the average molecular weight distribution of the PVOH polymer useful in the primer composition is between about 50,000 and about 185,000 and is at least 75% hydrolyzed (i.e., approximately less than 25% of the hydroxyl moieties are acetylated.

The PVOH useful in this invention may be modified by randomly replacing some of the hydroxyl groups with butyral side-groups as depicted by the formula:

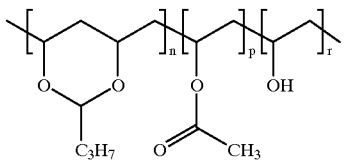

wherein n, p, and r denote the mole fractions of the polymer repeat units and the sum of n, p and r is 1. To achieve satisfactory wetting of barrier coating solutions on these primer layers, it is preferable that r is at least 0.75. Desirably, the average molecular weight of such a modified PVOH is between about 40,000 to 100,000.

The PVOH variants may be dissolved in a suitable solvent (e.g., water, isopropanol, or mixtures thereof) so that the primer composition is characterized by a solids level of between 0.1% and 10% by weight. When the polymer in the primer composition is PVOH, preferably, the solvent useful in the primer composition is water. However, other suitable solvents for PVOH may be readily selected by one of skill in the art.

It is well known that PVOH solutions support the growth of microorganisms. To prevent this, it is conventional practice to optionally add at least one biocidal agent to the coating solution. Desirable biocides include those with the active ingredients 5-chloro-2-methyl-4-isothiazolin-3-one, 2-methyl-4-isothiazolin-3-one, or 1-(3-chloroallyl)-3,5,7-triaza-1-azoniaadamantane chloride. A representative biocide that was found not to interfere with the performance of dried primer layers in coated articles of the present invention is Kathon® LX (Rohm and Haas).

Another embodiment of a vinyl polymer useful in the primer composition is a linear or branched poly(para-hydroxystyrene) (PHS) or variant thereof. There are a number of PHS variants available commercially and/or known to the art. For example, such PHS variants vary in characteristics such as molecular weight, impurities and degree of branching. While the examples below employ several variants of poly(para-hydroxystyrene), (i.e., branched, linear, and partially converted to phenoxide salts) it is anticipated that other PHS variants, for example copolymers in which the PHS mole fraction is at least 0.75, will work similarly in the primer composition and method of this invention.

Desirably, the primer composition containing PHS is characterized by a solids level of between 0.1% and 10% by weight. Preferably where the polymer in the primer composition is a PHS variant, the solvent is a dilute aqueous solution of alkaline metal hydroxide. For example, an alkali (i.e., lithium, potassium or sodium) hydroxide concentration of 0.1 N may be used to prepare a 1 weight percent solution of PHS. In this solvent PHS is partially converted to an alkali (i.e., lithium) phenoxide salt. The resulting linear or branched random copolymer having the formula:

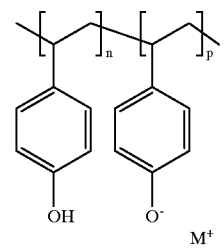

where $M^+$ is the monovalent cation (e.g., lithium) and the sum of the mole fractions, n and p, is 1. The mole fraction, p, of the phenoxide salt can be controlled by adjusting the concentration of alkaline metal hydroxide.

Dynamic contact angle experiments have demonstrated that use of PHS solutions in 0.1 N LiOH to form a primer layer on corona-treated, biaxially-oriented polypropylene (BOPP) films provides a surface that is completely wetted by water. Further, metal copolysilicate coatings have been found to wet such a primed surface extremely well, and barrier layers produced thereby give good vapor barrier performance. For solutions with lesser amounts of base, a cosolvent is required to achieve complete PHS dissolution. Such a cosolvent may be readily selected by one of skill in the art. One exemplary suitable cosolvent is isopropanol. Alternatively, PHS may be simply dissolved in an alcohol, such as ethanol, propanol, butanol, isopropanol (2-propanol) and similar alcohols, alone or in mixtures. Neutral PHS solutions prepared using high purity PHS (e.g. Hoechst Celanese Electronic Grade), yield neutral PHS primer layers that exhibit time-dependent and pH-dependent wettability. Solutions with pH above 12 completely wet neutral PHS primer layers. PHS primer solutions prepared using lower purity PHS (e.g. Hoechst Celanese Polymer Grade) yield primer layers that are equally wettable at any pH above 7.

Optionally, the primer solution, whatever the identity of the primer polymer, further contains one or more surfactant(s) to reduce surface tension. It was found that surfactants were unnecessary when applying primers by spin-coating; however, wetting requirements were more severe when applying primers by roll coating methods, e.g. reverse gravure coating. Suitable surfactants may be readily selected by one of skill in the art. The surfactant selected should possess a critical micelle concentration sufficiently low to ensure a dried primer coating uncompromised by residual surfactant. Preferably, the surfactant is selected from the group consisting of acetylenic diols (e.g., such as those provided commercially by Air Products) and alkyl ethoxylates (such as those provided commercially by, among others, Hoechst Celanese). Of the former group a preferred surfactant is Dynol® 604 surfactant, of the latter, Genapol® UD050 surfactant. The amount of surfactant added to the primer composition will depend on the particular surfactant selected, but should be the minimum amount of surfactant that enables adequate wetting of the primer solution on the polyolefin substrate. For example, typical surfactant amounts can be about 0.1% by weight of an acetylenic diol or an alkyl ethoxylate. Because Dynol® 604 surfactant is sparingly soluble in water, it has been observed that primer solutions containing 0.1% Dynol® 604 surfactant have droplets of undispersed surfactant floating on the surface of the primer solution. It was observed that this causes formation of scum around the meniscus of the coating solution in containers such as jars, drums, and solution holding tanks. In preferred primer solutions, this is alleviated by adding a second surfactant, preferably Genapol® UD050 surfactant, to improve the dispersion of Dynol® 604 surfactant.

III. The Waterborne, Inorganic Barrier Coating Compositions Useful in the Invention The method of the invention is useful with a variety of waterborne, inorganic coating compositions, such as those described below, that act as barriers to gases, vapors and aromas.

In one embodiment the inorganic, waterborne coating is an alkali metal polysilicate such as sodium polysilicate, potassium polysilicate, or lithium polysilicate or mixtures thereof.

In another embodiment the coating solution is a copolysilicate, i.e., a mixture of two different alkali metal polysilicates. In a preferred embodiment the barrier coating solution contains a copolysilicate of lithium and potassium represented by the formula, $(Li_2O)_x(K_2O)_{1-x}(SiO_2)_y$, wherein y is greater than 4.6 if x is less than 1, or x is greater than 0.5 if y is between 1 and 10.

Another desirable barrier coating contains a layered silicate (e.g. the delaminated vermiculite, MicroLite®, product of W. R. Grace) dispersed polysilica polysilicate (or mixtures thereof), such that the weight percentage of the layered silicate in the dried barrier coating layer ranges from 1% to 99%.

Another suitable barrier coating contains a metal polysilicate (or mixtures thereof) and transparent, nanocrystalline titanium dioxide. This coating is characterized by reduced interference between light reflected from the top surface of the dried coating and the interface between the dried coating and the poly(ethylene terephthalate) article.

Specific formulations of suitable barrier coatings for use in the method of this invention are described in the examples below.

IV. Practice of the Method

Advantageously, in the practice of the method of the invention, the primer composition promotes uniform application of the subsequently applied coating layer to the substrate and good adhesion of the dried inorganic barrier layer. The latter advantage is manifested in improved vapor barrier performance of coated articles prepared according to the present method.

A. The Substrate

The method of this invention is particularly well suited for use on polyester substrates such as poly(ethylene terephthalate) (PET). Especially preferred articles for coating according to the method of this invention are polymeric films and sheets, rigid and semi-rigid polymeric containers, bottles, jars, blisterpacks and lidstocks, and other surfaces made of the foregoing polyesters. In a particularly preferred embodiment, the articles are films or bottles used for food storage. Typically, PET films are biaxially oriented, depending on the customer requirements.

The poly(ethylene terephthalate) substrates to be coated by the primer and barrier coating composition according to this invention may be previously untreated. In fact, an advantage of this invention is that no other pretreatment of the PET article is necessary. Optionally, the poly(ethylene terephthalate) substrate, such as a film or bottle, may be first plasma treated to improve wetting by the primer solution and adhesion of the dried primer layer. Alternatively, the polymeric article may be corona-treated by the industry wide corona discharge treatment method. Other applicable surface treatments that may precede application of the primer layer are flame treatment and chemical oxidation or etching. Optionally, after applying the primer solution and drying, the dried primer layer may optionally be plasma treated, corona treated, flame treated, or chemically oxidized or etched before applying a barrier coating solution.

Alternatively, the article may bear on at least one surface or side, a heat seal layer. Examples of such heat seal layers are an ethylene-propylene copolymer or ethylene-propylene-butylene terpolymer.

Alternatively, the polymeric substrate may have a protective topcoat or laminate layer, such as polyurethane or Teflon®-type materials [DuPont]. Such topcoats or laminates may be selected by one of skill in the art, depending on the substrate and its intended use. The coating mixture of this invention may be applied over or under such additional layers.

Exemplary poly(ethylene terephthalate) substrates to be used in the examples below are biaxially-oriented Hostaphan® 2400 PET film (Hoechst Diafoil) and injection-stretch blow molded PET bottles (made of, for example, T-80 bottle resin, Hoechst Celanese).

B. Application of the Primer

In a preferred embodiment, the primer solution is applied to provide a dried layer thickness of between about 10 to about 50 nm primer composition on the substrate. Thicker layers offer satisfactory, but not superior, performance, and are therefore less preferable on the basis of cost. The primer may be applied by any means known to those of skill in the art. These techniques include, without limitation, roll coating, spray coating, brush coating and dip coating techniques. Conventional roll coating techniques include, but are not limited to, roll, rod, reverse roll, forward roll, air knife, knife over roll, blade, gravure and slot die coating methods. General descriptions of these types of coating methods may be found in texts, such as *Modern Coating and Drying Techniques*, (E. Cohen and E. Gutoff, eds.; VCH Publishers) New York (1992) and *Web Processing and Converting Technology and Equipment*, (D. Satas, ed.; Van Nostrand Reinhold) New York (1984). Three-dimensional articles may be preferably coated by spray coating or dip coating, among others. The method of application is not a limitation on the present invention, but may be selected from among these and other well-known methods by a person of skill in the art.

Preferred primer layers applied according to the present method are substantially continuous, i.e. very little of the poly(ethylene terephthalate) is exposed to the barrier coating solution. Dewetting of the primer solution from the substrate before or during drying causes voids in the primer layer and, subsequently, voids in the barrier layer. This yields a finished article having satisfactory vapor barrier performance for some applications. Atomic force microscopy may be used to confirm that dried primer layers are substantially continuous. Dewetting may be minimized by pretreatment of the poly(ethylene terephthalate) substrate before applying the primer solution, increasing surfactant concentration, or increasing the viscosity of the primer solution. The latter is readily accomplished in PVOH primers by using high molecular weight PVOH grades and increasing the percent PVOH solids in the primer solution.

The primer layer is allowed to dry before application of the coating layer. A conventional coating thickness of the selected waterborne inorganic oxide coating solution is applied over the primer layer, i.e., typical coating thicknesses as used in the absence of primer such as between about 100 and about 500 nm on the surface of the substrate. The application of the coating solution may be performed as described above for application of the primer composition.

After coating the article with a barrier coating solution, the resultant product must be dried at a selected temperature at or above room temperature. The selection of the drying temperature depends on the desired time for drying; that is, accelerated drying times may be achieved at elevated temperatures which would not be necessary if a longer time period for drying was acceptable. However, one of skill in the art can readily adjust the oven temperature and exposure as desired. The performance of the dried barrier coating is insensitive to the drying temperature over the range 25–200° C.

The use of a primer layer in the method of this invention promotes good, uniform adhesion of the subsequently applied barrier coating layer to the substrate. The resulting article (e.g., a PET film, 1 mil in thickness) coated according to the method of this invention is typically provided with an oxygen transmission rate (OTR) less than 1 cm$^3$/[m$^2$ day atm] at 23° C. and 50% relative humidity. Preferably, an OTR of about 0.1 cm$^3$/[m$^2$ day atm] at 23° C. and 50% relative humidity can be achieved. This performance has been reproducibly achieved in pilot scale reverse gravure coating experiments.

Significantly improved performance can be achieved if the dried barrier coating is covered with a protective top-coat layer. The top-coat may be either a thin (typically, but not necessarily, 1–10 μm thick) coating or a laminated film. Thin top-coatings may be applied by a variety of coating methods: roll coating, spray coating, dip coating. Laminates may be prepared by melt-extrusion lamination over the barrier coating or by adhesive lamination of a second film. Coated articles prepared according to the present method, when provided with protective top-coat layers, have achieved an OTR of about 0.5 cm$^3$/[m$^2$ day atm] at 23° C. and 50% relative humidity. The top-coat further provides improved flex resistance, i.e. retention of vapor barrier performance after flexing, and moisture resistance, i.e. retention of vapor barrier performance at high relative humidity.

The following examples illustrate the preferred primer solutions and methods of the invention. These examples are illustrative only and do not limit the scope of the invention.

EXAMPLE 1

Preparation of an Aqueous Poly(para-hydroxystyrene) Primer Solution

An exemplary aqueous base solution of poly(para-hydroxystyrene) primer (denoted PHS-Li) was prepared as follows. A 0.1 N solution of lithium hydroxide was prepared by dissolving 4.19 g lithium hydroxide monohydrate in sufficient distilled water to make 100.0 ml of solution. A one weight percent solution of PHS-Li was prepared by adding 1.00 g finely ground PHS (Hoechst Celanese, Polymer Grade) to 99.0 g of 0.1 N lithium hydroxide solution and heating at 50° C. until the solids were dissolved. The resulting brown-orange solution was filtered through fluted filter paper before use. A change in color of the solution from orange-brown to green-brown occurred on standing overnight, but did not affect the performance of the solution as a primer for metal polysilicate barrier coatings.

EXAMPLE 2

Preparation of a Solvent-based Poly(para-hydroxystyrene) Primer Solution

An exemplary alcoholic primer solution (denoted PHS-OH) of poly(para-hydroxystyrene) was prepared as follows. A one weight percent solution of PHS-OH was prepared by adding 1.00 g of finely ground PHS (Hoechst Celanese, Polymer Grade) to sufficient 2-propanol to make 100.0 ml of solution. The mixture was heated at 50° C. until the solids are dissolved. The resulting pale orange solution was filtered through fluted filter paper before use. A color change similar to that described in Example 1 occurred in this solution as well, but to a lesser extent and didn't affect the performance of the solution as a primer for metal polysilicate barrier coatings.

EXAMPLE 3

Preparation of a Poly(vinyl alcohol) Primer Solution

An exemplary poly(vinyl alcohol) (PVOH) primer solution of the invention was prepared as follows. One gram of PVOH (Aldrich, 98–99% hydrolyzed, molecular weight $M_w$=85,000–146,000) was added to 99.0 g distilled water in a round bottom flask. The mixture was heated to 80° C. and stirred until dissolution of polymer appeared complete. A water clear solution was obtained by filtering the hot solution through fluted filter paper. This primer solution, containing no surfactant, was found to be satisfactory for spin-coating experiments, but not roll-coating.

EXAMPLE 4

Characterization of a PVOH Primer Solution Containing a Branched Alkyl Ethoxylate Surfactant This example demonstrates the use of a branched alkyl ethoxylate surfactant in a poly(vinyl alcohol) primer solution. The PVOH primer was prepared as in Example 3 using high purity water (Fisher Scientific, Optima® grade) in a volumetric flask.

The surface tension, $\gamma_{lv}$, of liquids was measured with an automated Wilhelmy plate surface tensiometer (ATI Cahn DCA 315) with an auto-titrator for surfactant addition. The surface tension was first measured without surfactant, followed by step-wise additions of the Genapol® UD050 branched alkyl ethoxylate (Hoechst Celanese Corp.), followed by surface tension measurements. Table I presents the surface tension data.

It can be seen from this data that while PVOH has significant intrinsic surface activity, lowering the surface tension of water by ~8 dynes/cm, the branched alkyl ethoxylate surfactant exhibits nearly identical performance in the primer solution as in pure water. Both the critical micelle concentration (cmc=0.11 g/l) and the plateau value of surface tension (about 27 dynes/cm) are nearly identical for solutions with and without PVOH, any slight differences being attributable to the incremental surface activity of PVOH. There is neither a detrimental nor a synergistic interaction between PVOH and Genapol® UD050 surfactant.

TABLE I

Surface tension, $\gamma_{lv}$, of water and PVOH primer solutions as a function of Genapol® UD050 surfactant concentration

| Concentration Genapol® UD050 (g/l) | $\gamma_{lv}$ (dynes/cm) in H$_2$O | $\gamma_{lv}$ (dynes/cm) in 1% PVOH |
|---|---|---|
| 0.0000 | 72.16 | 64.41 |
| 0.0100 | 46.04 | 48.50 |
| 0.0299 | 37.24 | 38.92 |
| 0.0596 | 31.71 | 32.35 |
| 0.0990 | 28.42 | 28.13 |
| 0.1478 | 27.48 | 27.13 |
| 0.2057 | 27.28 | 26.90 |
| 0.2723 | 27.17 | 26.85 |
| 0.3475 | 27.27 | 26.82 |
| 0.4306 | 27.25 | 26.82 |
| 0.5213 | 27.26 | 26.76 |

EXAMPLE 5

Characterization of a PVOH Primer Solution Containing a Linear Alkyl Ethoxylate Surfactant This experiment demonstrates the use of a linear alkyl ethoxylate surfactant in PVOH primer solutions. Three primer solutions (1.0% w/w, 2.0% w/w, and 3.0% w/w) were prepared for the experiment as described in Example 3.

The surface tension, $\gamma_{lv}$, of liquids was measured as described in Example 4 with step-wise additions of the Genapol® 26-L-60N linear alkyl ethoxylate (Hoechst Celanese). Table II presents the surface tension data. It can be seen from Table II that above the critical micelle concentration (cmc=0.01 g/l), which is independent of PVOH concentration over this range, the plateau surface tension ($\gamma_{lv}$~31 dynes/cm) is likewise independent of PVOH concentration. There is no evidence of a detrimental or a synergistic interaction between PVOH and Genapol® 26-L-60N surfactant.

TABLE II

Surface tension, $\gamma_{lv}$, of water and PVOH primer solutions as a function of Genapol® 26-L-60N surfactant concentration

| Concentration Genapol® 26-L-60N (g/l) | $\gamma_{lv}$ (dynes/cm) in H$_2$O | $\gamma_{lv}$ (dynes/cm) in 1% PVOH | $\gamma_{lv}$ (dynes/cm) in 2% PVOH | $\gamma_{lv}$ (dynes/cm) in 3% PVOH |
|---|---|---|---|---|
| 0.00000 | 71.43 | 66.95 | 61.85 | 64.48 |
| 0.00040 | 56.24 | 53.02 | 51.73 | 53.05 |
| 0.00120 | 48.74 | 45.82 | 43.31 | 44.61 |
| 0.00239 | 43.62 | 40.70 | 38.60 | 39.87 |
| 0.00398 | 39.85 | 37.00 | 35.25 | 35.39 |
| 0.00596 | 36.60 | 34.15 | 32.84 | 33.41 |
| 0.00833 | 33.92 | 32.54 | 31.53 | 31.81 |
| 0.01108 | 32.41 | 31.58 | 30.99 | 31.14 |
| 0.01420 | 30.86 | 31.31 | 30.41 | 30.75 |
| 0.01768 | 30.47 | 31.05 | 30.45 | 30.67 |
| 0.02153 | 30.35 | 30.98 | 30.51 | 30.74 |
| 0.02572 | 30.37 | 31.06 | 30.49 | 30.79 |
| 0.03026 | 30.42 | 30.89 | 30.66 | 30.93 |

EXAMPLE 6

Wettability of Poly(vinyl alochol)/poly(vinyl butyral) Primer Layers

A series of primer solutions were prepared using butyral-modified PVOH polymers depicted by the formula:

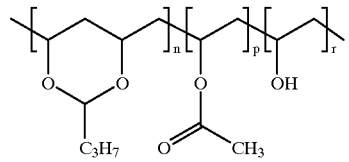

wherein n, p, and r denote the mole fractions of the polymer repeat units and the sum of n, p and r is 1. These polymers, further described in Table III, were dissolved in water, isopropanol, or water/isopropanol mixtures. No surfactant was added to these primer solutions. Primed samples were prepared by dip-coating flame-cleaned microscope cover slips in the primer solutions. Advancing and receding contact angles of water on these primer layers were measured using a Cahn-ATI DCA 315 dynamic contact angle analyzer. The results are presented in Table III. Unsatisfactory wetting was observed for $n \geq 0.70$.

TABLE III

Approximate Compositions and Dynamic Contact Angles (Advancing and Receding) for a Series of Butyral-modified PVOH Variants

| Mole Fraction Butyral, n | Mole Fraction Acetate, p | Mole Fraction Hydroxyl, r | Advancing Contact Angle | Receding Contact Angle |
|---|---|---|---|---|
| 0.0 | 0.02 | 0.98 | 36° | 16° |
| 0.05 | 0.02 | 0.93 | 54.6° | 23.3° |
| 0.10 | 0.02 | 0.88 | 53° | 22.5° |
| 0.70 | 0.02 | 0.28 | 83.2° | 36.9° |
| 0.76 | 0.02 | 0.22 | 81.6° | 38.8° |
| 0.83 | 0.02 | 0.15 | 82.3° | 44.2° |

EXAMPLE 7

Effect of Priming on Coated Articles

Poly(vinyl alcohol) (Aldrich, 98–99% hydrolyzed, average $M_w$, 85,000–146,000), 30 g, was added to 3000 g distilled water in a beaker. The mixture was heated to 80° C. and stirred until dissolution of polymer appeared was complete. A water clear solution was obtained by filtering the hot solution through fluted filter paper.

A solution (5.0% solids) of lithium-potassium copolysilicate, $(Li_2O)_x(K_2O)_{1-x}(SiO_2)_y$, was prepared wherein x, the molar fraction of $Li_2O$ as a fraction of the combined metal oxides ($M_2O$) was 0.5 and y, the $SiO_2$:$M_2O$ mole ratio was 3.6, by diluting Inobond® Li 2043 solution, 387 g with distilled water, 2082 g. The dispersion was stirred and to it added K-4009 solution, 530 g. The dispersion was again stirred and diluted further with distilled water, 3000 g, with stirring. Biaxially oriented poly(ethylene terephthalate) film was run through a multiple stage reverse gravure roll coater such that a primer layer of PVOH was applied and dried followed by application of a lithium-potassium copolysilicate barrier coating solution and drying. In some instances no barrier coating was applied.

Oxygen transmission rate (OTR) measurements were made using a Mocon Ox-Tran® 2/20 instrument at 30° C. under dry conditions. A film that was coated only with PVOH primer solution had an oxygen transmission rate of 9 $cm^3/[m^2$ day atm]; while a film that was coated with PVOH primer and lithium-potassium copolysilicate had an oxygen transmission rate of 0.6 $cm^3/[m^2$ day atm].

EXAMPLE 8

Effect of Priming on Barrier Performance of Coated Articles

A 0.1 N solution of lithium hydroxide was prepared by dissolving 12.6 g lithium hydroxide monohydrate in 3000 ml distilled water with stirring. A one weight percent solution of PHS is prepared by adding 30 g finely ground PHS (Polymer Grade, Hoechst Celanese) to the stirring lithium hydroxide solution. Dynol® 604 surfactant (Air Products), 0.3 g, was added to the mixture with continuous stirring. The suspension was stirred with heating at 80° C. until dissolution was complete. The resulting brown-orange solution (PHS-Li) was filtered through fluted filter paper before use.

A lithium-potassium copolysilicate, $(Li_2O)_x(K_2O)_{1-x}$ $(SiO_2)_y$, (x=0.5, y=3.6, and total solids level of 10% w/w) was prepared by diluting 387 g of Inobond® Li 2043 solution with 2082 g of distilled water. While stirring, 530 g of potassium polysilicate, K-4009 solution, was added. Biaxially-oriented poly(ethylene terephthalate) film was run through a multiple stage reverse gravure roll coater such that a primer layer of PHS-Li was applied and dried, and either followed or not by a second coating application of a lithium-potassium copolysilicate dispersion and drying.

OTR measurements were made using a Mocon Ox-Tran® 2/20 instrument at 30° C. under dry conditions. A film that was coated only with PVOH primer solution had an OTR of 155 $cm^3/[m^2$ day atm]; while a film that was coated with PHS-Li primer and lithium-potassium copolysilicate had an oxygen transmission rate of 4 $cm^3/[m^2$ day atm].

EXAMPLE 9

Effect of Priming on Coated Articles

Lithium polysilicate barrier coating solutions containing dispersed vermiculite were prepared using the amounts shown in Table V by first diluting the MicroLite® 963 Plus+ dispersion with water and then adding the lithium polysilicate solution to it with stirring. Hostaphan® 2400, biaxially oriented poly(ethylene terephthalate) (0.5 mil thick) film was run through a multiple stage reverse gravure roll coater such that a primer layer of PHS-Li or PHS-OH (prepared as described in Examples 1 and 2) was applied and dried, and followed by application of a lithium polysilicate/dispersed vermiculite coating solution. Both coating and drying were accomplished using a reverse gravure roll coating process.

OTR measurements were made using a Mocon Ox-Tran® 2/20 instrument at 30° C. under dry conditions. OTR data are presented in Table IV.

TABLE IV

Lithium Polysilicate/Dispersed Vermiculite Barrier Coatings Applied by Reverse Gravure Roll Coating to PET Film

| Primer | Percent (w/w) lithium polysilicate in dried coating | Total Percent solids | MicroLite® 963 Plus+ Dispersion (g) | Inobond® Li 2043 (g) | Distilled Water (g) | OTR $cm^3/[m^2$ day atm] (30° C. & 0% RH) |
|---|---|---|---|---|---|---|
| PHS-Li | 20 | 7.5 | 2400 | 164 | 436 | 18 |
| PVOH | 40 | 7.5 | 1800 | 327 | 872 | 1 |

EXAMPLE 10

Comparative Example

A coating was prepared according to Example 3 of U.S. Pat. No. 5,330,794. To a 500 ml plastic beaker, with continuous overhead stirring at 400 rpm, was added 47.11 g of KASIL® #1 potassium polysilicate (PQ Corp.), followed by slow addition of 1.01 g of methyltrimethoxysilane. This was stirred for 15 minutes before slowly adding 27.39 g of Ludox® AS-30 colloidal silica (DuPont). Next, 26.10 g of distilled water was added, again with continuous stirring, followed by slow addition of 12.02 g of talc and 55.46 g of ceramic microspheres (3M Corp.). This mixture was stirred for 30 minutes, during which time the consistency went from thick paste to a smoother coating slurry. Attempts to filter this through 120 mesh screen were unsuccessful.

The coating slurry was applied to plasma-treated PET film (0.9 mil thick) using a #3 Meyer rod on a drawdown machine, a procedure that works well for polysilicate barrier coatings of the present invention. The dried coating was gritty, rough, and hazy. Essentially all of the coating delaminated from the PET film. In the experience of the present inventors, the particle size (60 micron) of the ceramic microspheres is much too large to permit this composition to be used as a vapor barrier coating (typically <0.5 micron thick) for thin, flexible food packaging film. Chromium trioxide and ceramic fibers (Unifrax Corp.) were omitted from the present comparative example; these materials are expected to make the coating even less suitable for vapor barrier applications on thin, flexible film.

Numerous modifications and variations of the present invention are included in the above-identified specification and are expected to be obvious to one of skill in the art. Such modifications and alterations to the compositions and processes of the present invention are believed to be encompassed in the scope of the claims appended hereto.

What is claimed is:

1. A barrier-coated poly(ethylene terephthalate) article comprising:
   (a) a poly(ethylene terephthalate) substrate;
   (b) a primer layer between about 10 nm and 50 nm thick when dry, said primer containing a random vinyl polymer comprised of repeat units, wherein at least 75 percent of said polymer repeat units contain side groups having hydroxyl moieties; and
   (c) an inorganic barrier layer applied from a waterborne coating solution.

2. The article according to claim 1 wherein said substrate is plasma treated, corona treated, flame treated or chemically etched/oxidized before application of the primer layer.

3. The article according to claim 1 wherein said primer layer is plasma treated, corona treated, flame treated or chemically etched/oxidized before application of the inorganic barrier layer.

4. The article according to claim 1 wherein said vinyl polymer is poly(vinyl alcohol).

5. The article according to claim 4 wherein the average molecular weight of said poly(vinyl alcohol) in the primer composition is between 50,000 and 150,000 and the degree of hydrolysis is at least 75%.

6. The article according to claim 1 wherein said random vinyl polymer is a modified poly(vinyl alcohol) of the formula:

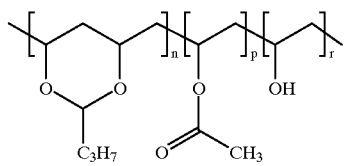

wherein n, p, and r denote the mole fractions of the polymer repeat units and the sum of n, p and r is 1.

7. The article according to claim 6 wherein the average molecular weight of said modified poly(vinyl alcohol) is between 40,000 and 100,000, and r is at least 0.75.

8. The article according to claim 1 wherein said vinyl polymer is either a linear or branched poly(para-hydroxystyrene).

9. The article according to claim 8 wherein said poly(para-hydroxystyrene) is partially converted to an alkali metal phenoxide salt, the resulting linear or branched random copolymer having the formula:

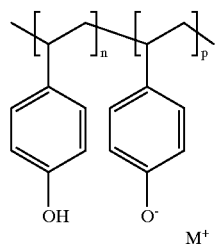

where M$^+$ is the monovalent cation of one or more of the alkali metals lithium, sodium, or potassium, and the sum of the mole fractions, n and p, is 1.

10. The article according to claim 1 wherein the primer layer contains one or more surfactants.

11. The article according to claim 10 wherein at least one surfactant is an acetylenic diol and a second surfactant is an alcohol ethoxylate.

12. The article according to claim 1 wherein said coating solution comprises sodium polysilicate, potassium polysilicate, lithium polysilicate, or mixtures thereof.

13. The article according to claim 12 wherein said coating solution comprises a copolysilicate of lithium and potassium of formula $(Li_2O)_x(K_2O)_{1-x}(SiO_2)_y$ wherein (i) y is greater than 4.6 if x is less than 1 or (ii) x is greater than 0.5 if y is between 1 and 10.

14. The article according to claim 1 wherein said barrier layer comprises a layered silicate dispersed in a solid matrix of alkali metal polysilicate, wherein the weight fraction of layered silicate in the alkali metal polysilicate ranges from 0.01 to 0.99.

15. The article according claim 1 wherein said barrier layer comprises an alkali metal polysilicate and transparent nanocrystalline titanium dioxide, said coating characterized by reduced interference between light reflected from the top surface of the dried coating and the interface between the dried coating and the poly(ethylene terephthalate) substrate.

16. The article according to claim 1 further comprising a protective topcoat layer.

17. The article according to claim 1 wherein said substrate is selected from the group consisting of a polymeric film, a polymeric sheet, and a rigid or semi-rigid polymeric container.

18. A method for providing a barrier coating to a poly(ethylene terephthalate) substrate comprising the steps of:
   (a) applying to said substrate a primer layer which dries to a thickness of between about 10 nm and 50 nm, said primer containing a random vinyl polymer comprised of repeat units, wherein at least 75 percent of said polymer repeat units contain side groups having hydroxyl moieties;
   (b) allowing the primer layer to dry; and
   (c) applying a waterborne, coating solution which forms a dry inorganic barrier layer over the dried primer layer.

19. The method according to claim 18 further comprising subjecting said substrate to plasma treatment, corona treatment, flame treatment or chemical etching and oxidation prior to application of said primer.

20. The method according to claim 18 further comprising subjecting said substrate with its dried primer layer to plasma treatment, corona treatment, flame treatment or chemical etching and oxidation prior to application of said coating solution.

21. The method according to claim 18 wherein said vinyl polymer is poly(vinyl alcohol).

22. The method according to claim 21 wherein the average molecular weight of said poly(vinyl alcohol) in the primer layer is between 50,000 and 150,000 and the degree of hydrolysis is at least 75%.

23. The method according to claim 18 wherein said random vinyl polymer is a modified poly(vinyl alcohol) of the formula:

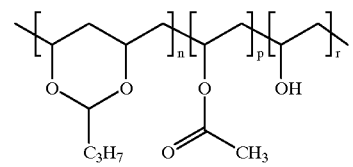

wherein n, p, and r denote the mole fractions of the polymer repeat units and the sum of n, p and r is 1.

24. The method according to claim 23 wherein the average molecular weight of said modified poly(vinyl alcohol) is between 40,000 and 100,000, and r is greater than 0.75.

25. The method according to claim 18 wherein said vinyl polymer is either a linear or branched poly(para-hydroxystyrene).

26. The method according to claim 25 wherein said poly(para-hydroxystyrene) is partially converted to an alkali metal phenoxide salt, the resulting linear or branched random copolymer having the formula:

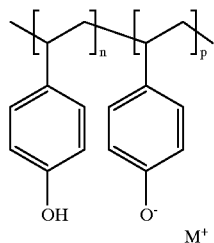

where $M^+$ is the monovalent cation of one or more of the alkali metals lithium, sodium, or potassium, and the sum of the mole fractions, n and p, is 1.

27. The method according to claim 18 wherein the primer layer contains one or more surfactants.

28. The method according to claim 27 wherein at least one surfactant is an alcohol ethoxylate.

29. The method according to claim 18 wherein said coating solution comprises sodium polysilicate, potassium polysilicate, lithium polysilicate, or mixtures thereof.

30. The method according to claim 29 wherein said coating solution comprises a copolysilicate of lithium and potassium of formula $(Li_2O)_x(K_2O)_{1-x}(SiO_2)_y$ wherein (i) y is between 1 and 10, if x is less than 1; or (ii) y is greater than 4.6, if x is 1.

31. The method according to claim 18 wherein said barrier layer comprises a layered silicate dispersed in a solid matrix of alkali metal polysilicate, wherein the weight fraction of layered silicate in the alkali metal polysilicate ranges from 0.01 to 0.99.

32. The method according to claim 18 further comprising applying a protective topcoat layer over said dried barrier layer.

33. The method according claim 18 wherein said inorganic barrier layer is a vapor barrier comprising an alkali metal polysilicate and transparent nanocrystalline titanium dioxide, said barrier layer characterized by reduced interference between light reflected from the top surface of the dried barrier layer and the interface between the dried barrier layer and the poly(ethylene terephthalate) substrate.

* * * * *

UNITED STATES PATENT AND TRADEMARK OFFICE
CERTIFICATE OF CORRECTION

PATENT NO.   : 6,086,991
DATED        : July 25, 2000
INVENTOR(S)  : M. Hubbard et al It is certified that error appears in the above-indentified patent and that said Letters Patent is hereby corrected as shown below:

Column 5, line 37, replace "polysilica" with -- in a metal --

Signed and Sealed this

Seventeenth Day of April, 2001

Attest:

NICHOLAS P. GODICI

Attesting Officer   Acting Director of the United States Patent and Trademark Office